Patented Nov. 23, 1926.

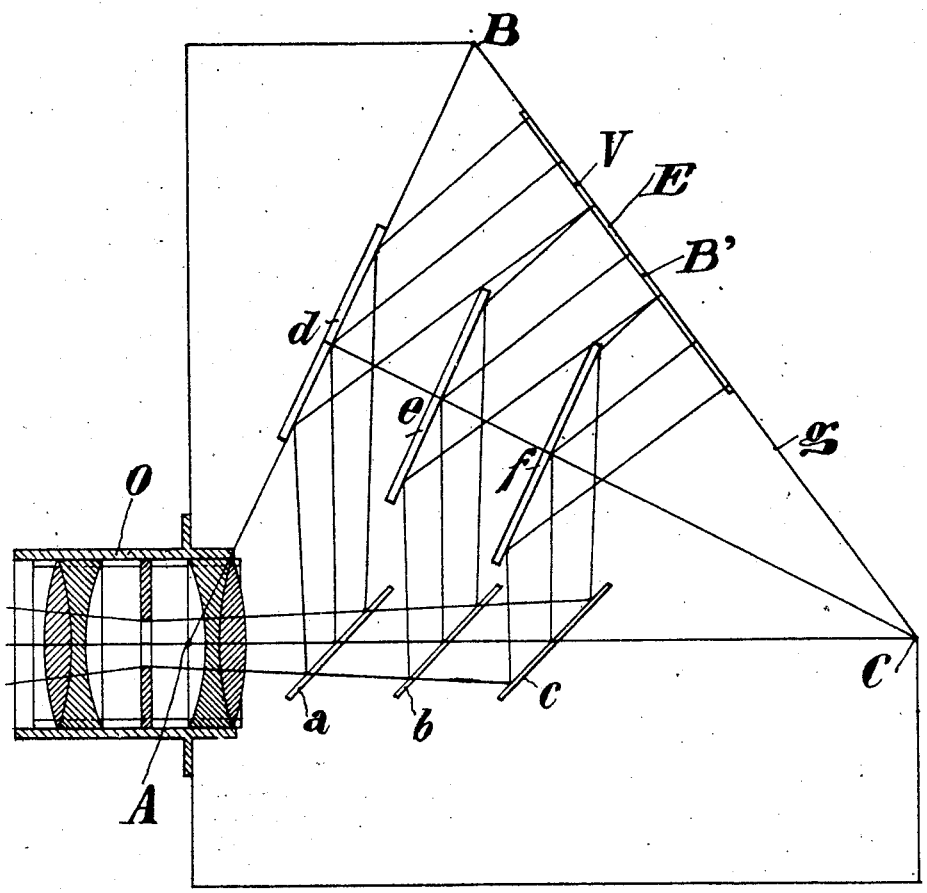

1,607,661

UNITED STATES PATENT OFFICE.

LOUIS ALBERT, OF BELLEGARDE, FRANCE.

APPARATUS FOR MANIFOLD-COLORED CINEMATIC PHOTOGRAPHS.

Application filed July 9, 1923, Serial No. 650,419, and in France July 18, 1922.

My invention relates to improvements in apparatus for obtaining manifold colored cinematic photographs.

In apparatus for taking photographic views in several colors which allows the analysis and synthesis of colors by means of a single object glass, it is customary to use for the production of a fractional image mirrors inclined at an angle of 45° to the optical axis and placed in the prolongation of the axis of the object glass. Generally three such mirrors are used, the two first being transparent while the latter is opaque.

It is likewise well known to provide the transparent mirrors with a coating of color to prevent a double reflection which usually takes place with transparent mirrors. The different devices hitherto known for allowing the fractional image to be fixed on a side tray with the aid of a single object glass such as is necessary for projections have serious defects which greatly impair their capacity for use. These defects are due to the arrangement of the reflectors relatively to the sensitive surface which does not allow the production of the various images in the same focal plane, whereby optical corrections become necessary.

The apparatus constructed according to this invention has for its object to remedy the above defects and is particularly characterized by the respective position of the reflecting surfaces which is such as to be able to dispense with adjusting devices in order to obtain an optical way of similar length for fractional images which should be in a common plane.

To facilitate the understanding of the main object of my invention a constructive form of the same is diagrammatically illustrated in the accompanying drawings.

As will be seen from the latter, $a\ b\ c$ are three mirrors the two first of which are transparent while the other is opaque, these mirrors serving to divide into three the luminous rays emerging from the object glass O, the latter rays however are reflected by a set of mirrors $d\ e\ f$ superficially silvered and cast perpendicularly upon a sensitive surface E arranged at $g$, when after having traversed the gradation shades V (green) and $B^1$ (blue), they are registered in proximity one to the other and in the same plane.

The transparent mirrors $a$ and $b$ are formed of glass or mica lamellæ or of other fixed, transparent and perfectly horizontal substance and coated with a layer of varnish or gelatine which is covered over with a color complementary to that of the corresponding gradation shade.

In this way $a$ which serves to transmit the image on the green shade has a dark pink color, whereby the double reflection which occurs with all mirrors and produces a double image is entirely avoided. In reality the rays cast back through the rear side of $a$ are colored red on their return and are thrown back by the gradation shade V (green), the same thing happens with the mirror $b$ which is colored orange yellow and thus corresponds to the gradation shade $B^1$ (blue).

Instead of colored glasses, half transparent glass mirrors either platinized or silvered could be likewise used; as to the mirror $c$ it could be replaced by a mirror with full reflection for instance by glass superficially silvered or by polished metal and the like which renders it fit to fully transfer the red or orange yellow image through $a$ and $b$ which would then play the part of shades.

$d$, $e$, $f$ are mirrors which are intended to fully transfer the rays divided by $a\ b\ c$ to the sensitive layer and for that purpose they as well as the last named mirrors should be formed with superficially silvered mirrors or prisms of suitable angles.

With regards to the position of the different parts as well as to the slope to be given to the sensitive layer, a triangle A, B, C, is drawn with a base AB similar to the height $d$C. The line AC represents the object glass as round, its length is given by the focal point of the device, the line BC gives the position of the sensitive layers, AB is the inclination which must be given to the mirrors $d\ e\ f$ relatively to the other parts.

As the masses of light to be transmitted by the mirrors $a\ b\ c$ are not alike, this fact is utilized by arranging the gradation shade in such a manner that the color requiring the longest exposure shall be the one to receive the greatest mass of light; this is the reason why the device before mentioned was designed to meet such requirements.

In consequence of the degree of transparence of the mirrors $a$ and $b$ being liable to change, their reflective power may also change, wherefore the degree of sensitiveness of the different colors of the chromatic emulsion will have to be taken into consideration, and it will be then possible to obtain automatically the exact time of exposure for the three colors.

This apparatus is reversible and by using the same in order to obtain colored photographic views and to convert a negative into a positive, it will be sufficient to place the latter in the spot occupied by the sensitive plate and after replacing the ocular by a magnifying glass across the former while lighting up the cliché with a white light the object is thus seen with its proper colors and it becomes thus possible to soften the orange red image.

By using the various devices above set forth for cinematic photographies the projecting apparatus is to be built on the same principle as the view taking apparatus, and it will be practicable to modify the reflecting power of the mirrors $a$ $b$ $c$ as well as the colors of the reflecting shades in such a manner that all colors with their proper shading can be reproduced according to the source of light employed.

The arrangement can be arranged once for good. The mirrors $a$ $b$ $c$ may be jointed, so that owing to their different slopes all defects in the marking due to the shifting of the film can be remedied.

It may be noticed that in devices or apparatus according to this invention no perpendicular or horizontal shifting of the film which often occurs in the course of cinematic projections can cause as a consequence any serious alterations in the marking of the colors.

I claim:

An apparatus for use in color photography, comprising mirrors inclined to the optical axis at an angle of 45° to divide the pencil rays from the objective, a sensitive or receptive surface, and associated reflecting surfaces positioned and inclined to receive and reflect onto the receptive surface the partial images reflected by the mirrors, the reflecting surfaces being arranged perpendicular to the altitude of an isosceles triangle having its base equal to the altitude where one side of such triangle is constituted by the optical axis and the other side forms the plane of the receptive surface.

In testimony whereof I affix my signature.

LOUIS ALBERT.